May 26, 1942.　　　H. A. STILSON　　　2,284,543
ANIMAL TRAP
Filed Feb. 11, 1941
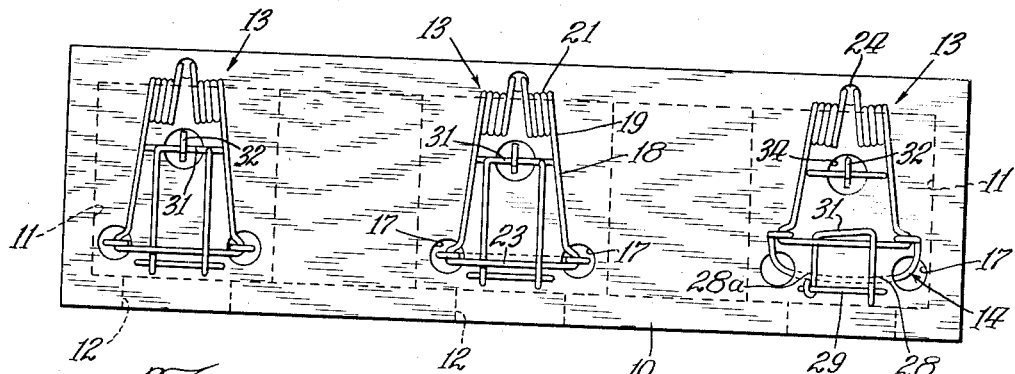
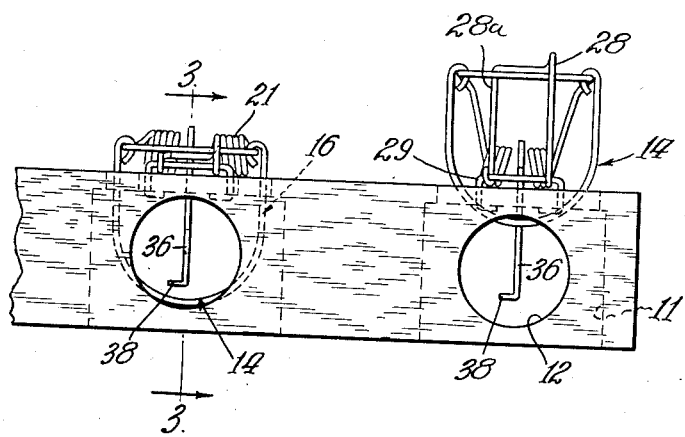
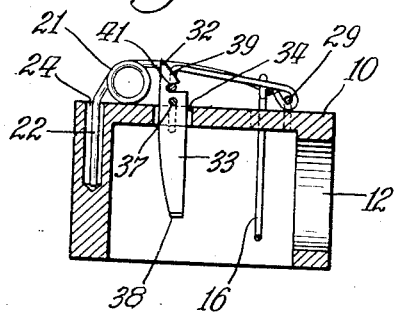
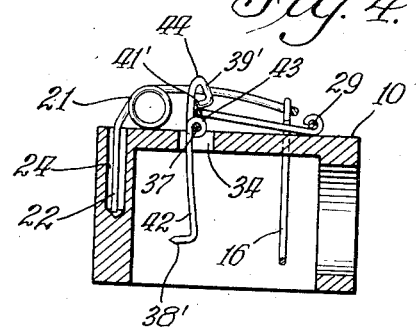
Inventor:
Herbert A. Stilson
By: Foorman L. Mueller
Atty.

Patented May 26, 1942

2,284,543

UNITED STATES PATENT OFFICE 2,284,543

ANIMAL TRAP

Herbert A. Stilson, Chicago, Ill.

Application February 11, 1941, Serial No. 378,422

3 Claims. (Cl. 43—86)

This invention relates in general to animal traps and in particular to an improved latching mechanism for an animal trap of the type having a spring-operated loop or noose member for snaring the animal.

Among the prior art animal traps are devices having a polygonal base and a plurality of similar trap units mounted thereon opposite certain sides of the base member. Each trap unit is associated with a cavity formed in a corresponding side and extending radially of the base member. A loop or noose member is located within and near the entrance of a cavity and is adapted for movement thereacross, with the springing of the noose member being accomplished by a spring member supported on the top of the base member. A bait treadle is pivotally supported on the base member having a bait portion extending within the cavity and in a position in substantial alignment with the entrance thereto so that an animal approaching the bait is positioned within the loop. In the setting of this prior art trap assembly it is necessary that the spring member be manually depressed and retained in a depressed position while a latch member is manually engaged in a locking position with a catch portion of the bait treadle which extends above the base member. Since the latch is usually pivotally connected at one end to the base independently of the spring member, considerable difficulty and inconvenience is encountered in setting the trap by virtue of the fact that the latch is free to move under the spring member and between the loop member. Further, the use of a polygonal base member appreciably increases the manufacturing costs of the trap assembly due to the waste of material and time in the cutting of the sides and the requirement for a radial drilling of the cavities.

It is an object of this invention, therefore, to provide an improved animal trap.

Another object of this invention is to provide an improved latching mechanism for an animal trap.

Yet another object of this invention is to provide a self-setting animal trap of the type having a spring-operated loop member for snaring the animals.

A still further object of this invention is to provide an animal trap which is of simple construction, easily and safely set for operation, and inexpensive in cost.

A particular feature of this invention is the provision of an improved latching mechanism for a trap having a spring-operated noose member for snaring the animal, in which the latching mechanism moves the operating spring to a set position concurrently with its movement to a latching position.

Yet another feature of this invention is found in the provision of a noose type trap assembly for catching animals in which a plurality of similar trap units are supported side by side in spaced relation longitudinally of a common base member.

Further objects, features and advantages of this invention will become apparent from the following description when taken in connection with the accompanying drawing in which:

Fig. 1 is a plan view of a complete trap assembly;

Fig. 2 is a fragmentary front elevational view of the device shown in Fig. 1;

Fig. 3 is a sectional view as seen along the line 3—3 in Fig. 2; and

Fig. 4 is a modified form of the invention.

In practicing this invention it is contemplated that a single base member be used with a plurality of similar trap units, each of which functions to snare the animal by means of a spring-actuated noose or snare member. A bait treadle is arranged so that the bait holding portion thereof is substantially opposite the noose member when such member is in an open position. A self-setting of the trap is accomplished by an improved latching mechanism which is in interlocking engagement with a spring member but slidable relative thereto, with the latching mechanism being adapted to move the spring member to a set position concurrently with its movement into latching engagement with the bait treadle.

With reference to the drawing, the invention is shown as including a base member 10 formed with a plurality of laterally extending cavities 11 spaced longitudinally thereof and having inlet openings 12.

It is readily apparent that the cavities 11 may be easily and cheaply formed by a straight gang drill or by a single drill of vertical type. This drilling operation may be made either before or after the cutting to length of the base member from stock material, since this cutting occurs between the cavities. By virtue of a base member of rectangular shape, therefore, manufacturing costs of the trap are reduced to a minimum. Each cavity 11 is associated with a trap unit, designated generally as 13, with the trap unit at the extreme right in Figs. 1 and 2 being illustrated in an open or released position. Since all of the trap units 13 are of similar construction, only one thereof will be referred to in the following description.

Each trap unit 13 includes a wire noose or snare member 14 which is of substantially U-shape. The member 14 is movable across the cavity 11 and is provided with leg portions 16 extending upwardly from the base member through apertures 17 formed in the base member in registry with the cavity 11. The upper end of each leg member 16 is bent or hooked for pivotal connection with a spring member 18. The member 18 is of integral wire construction and is of substantially U-shape with each of its leg members 19 formed with a coil spring 21 intermediate the ends thereof. End portions 22 of the leg members 19 are suitably anchored in the base member 10 by their insertion in a bore or cavity 24 formed therein, and are arranged relative to their corresponding coil spring 21 such that the springs 21 are in a released position when the connecting portion 23 of the member 18 is away from the base member 10. As is clearly shown by the trap unit at the right in Fig. 2 the release position of the springs 21 corresponds to a position of the noose member 14 at the top of the cavity 11. On movement of the spring member 18 toward the base member, the springs 21 are wound or tensioned, with this position of the spring member corresponding to a position of the noose member 14 toward the bottom of the cavity 11 as shown by the trap unit at the left in Fig. 2. This bottom position of the noose indicates a set position for the trap which is retained by an improved latching means including a substantially U-shaped latching member 27.

The latching member 27 is formed of wire and has leg portions 28 and 28a off-set from each other and in straddling engagement with the leg connecting portion 23 of the spring member 18. The free end of each leg member 28 and 28a is hooked for pivotal connection with an axis pin or rod 29 anchored in the base member 10. By virtue of this assembly of the latching member 27 with the spring member 18 such two members are interlocked but relatively movable, the connecting portion 23 being slidable between the leg members 28 and 28a. The leg connecting portion 31 of the latching member 27 is movable into latching engagement with a catch or lock portion 32 (Fig. 3) provided on a bait treadle 33. Treadle 33 is positioned in an aperture 34 in register with the cavity 11 so that its bait holding portion 36 is positioned within the cavity and substantially opposite the noose member 14. The treadle 33 is pivotally movable within the aperture 34 and is pivotally supported on axis means 37 mounted in the base member 10. As illustrated in Fig. 3 the treadle 33 is of substantially flat form with the bait hook or prong 38 being bent outwardly at right angles to the body portion of the treadle and the catch portion 32 including a cam surface or side 39 with a shoulder 41 at one end thereof. On pivotal movement of the latching member 27 toward the base member 10, the connecting portion 31 slidably engages the cam surface 39 and pivotally moves the treadle 33 until the shoulder 41 engages the portion 31. This latter engagement serves to retain or lock the latch 27 in its latched position.

During this movement of the latching member into latching engagement with the treadle 33 the portion 23 of the spring member is urged downwardly toward the base member 10 by the leg member 28 of the latching member, so that the spring member 18 is moved to a set position concurrently with the moving of the latch to its latching position. A self-setting of the trap is thus accomplished very simply and with absolute safety by merely moving the latch into locking engagement with the bait treadle. By virtue of this construction, a separate moving of the spring member to its set position and then the application of manual pressure thereon to hold it in a set position while the latching member is being latched along with the inconveniences attending such a setting, are entirely eliminated.

With the trap in a set or unsprung position, springing thereof occurs when the bait treadle 33 is pivotally moved in a counter-clockwise direction as viewed in Fig. 3. In order to move the treadle in this direction, it is necessary that the animal to be trapped approach the bait which is on the prong 38 by way of the inlet 12 and through the noose member 14. Pulling on the bait, therefore, moves the treadle 33 in the proper direction to release the latch 27 and in turn the spring member 18 which draws the noose 14 upwardly and about the animal in the trap. To withdraw the trapped animal the trap is merely reset. As is clearly shown in Fig. 3 the cavity 11 may be open at the bottom of the base member 10 to facilitate withdrawal of the animal and baiting of the treadle 33.

A modified form of the bait treadle is shown in Fig. 4. The treadle 42 is integrally constructed of a single piece of wire and comprises a bait prong 38', an eyelet 43 and a closed hook or catch portion 44 at the other end thereof. The eyelet 43 is adapted to receive the axis means 37 for pivotally supporting the treadle on the base member 10. The closed hook portion 44 is formed with a cam surface or side 39' and a shoulder 41' which coact with the leg connecting portion 31 of the latch member 27 in a manner similar to that above described for the bait treadle 33. A further description of the operation of the trap unit shown in Fig. 4, therefore, is believed to be unnecessary. By using a bait treadle constructed entirely of wire, all of the parts of the trap unit are thus formed of wire which may be of the same gauge, thus reducing manufacturing costs of the device to a minimum.

There is thus provided an animal trap adapted to snare animals, which is rugged and simple in construction, and inexpensive in cost. The trap is completely self-setting on movement of the latch to a latching position. Particularly where the trap is to be used for mice, the rectangular shape of the base member permits the locating of the trap immediately adjacent a wall or the like, so as to be out of the way while yet exposing a plurality of openings for luring the mice within the trap.

It is to be understood that although the invention has been described with specific reference to a preferred embodiment thereof, it is not to be so limited since modifications and alterations therein can be made which are within the full intended scope of this invention as defined by the appended claims.

I claim:

1. In an animal trap including a base member having a cavity therein, a noose member movable across said cavity, a wire spring member of substantially U-shape movably supported on said base member and having the leg connecting portion thereof operatively connected with said noose member to move the same, a pivoted bait treadle having one end positioned within said cavity and its opposite end extending outwardly from said base member, said opposite end having a projection formed thereon, means pivotally supporting said bait treadle on said base member, and a pivoted latching member of substantially U-shape movable into latching engagement with said projection to lock said spring member in a set position, with the leg portions of said latching member being laterally off-set from each other, and each leg portion being on an opposite side of said spring member connecting portion for slidable but interlocked engagement therewith, with said spring member being movable by said latching member to said set position when said latching means is moved to its latching position.

2. In an animal trap for snaring animals including a base member having a cavity formed therein and a noose member movable across said cavity, a wire spring member movably supported on said base member and operatively connected with said noose member to move the same, a wire bait treadle of integral construction formed with an eyelet substantially intermediate its ends and a closed hook at one of said ends, axis means pivotally supporting said bait treadle on said base member at said eyelet, with said one end extending from said base member and the opposite end extending into said cavity, and wire latching means having a pair of leg portions and a portion connecting one of the corresponding ends of said leg portions, said leg portions being off-set relative to said connecting portion and positioned on opposite sides of said spring member, the other ends of said leg portions being pivotally connected with said base member to interlock said leg portions in a straddling position with said spring member, said connecting portion being movable into abutting engagement with said closed hook to releasably lock said spring member in a set position, with said leg portions slidably engaging said spring member on movement of said latching means to said latched position to concurrently move said spring member to a set position.

3. In a trap for snaring animals in which a noose member is operated by a U-shaped spring member having the portion connecting the legs thereof operatively engageable with said noose member, a base member, a pivoted bait treadle having a bait holding portion at one end and a catch portion at its other end, with a cam surface provided on one side of said catch portion, means pivotally supporting said treadle on said base member with said one end opposite said noose member, and means for retaining said spring member in a set position including a substantially U-shaped pivoted latching member having leg portions and a base portion connecting said leg portions, with one of said leg portions being off-set from said base portion, said leg portions being arranged on opposite sides of said spring member connecting portion, with the free ends of said leg portions pivotally supported on said base member to interlock said spring and latching members, said base portion being movable into sliding engagement with said cam surface for locking engagement with said catch portion, and said leg portions on movement of said latching means to its locked position slidably engaging the connecting portion of said spring member to concurrently move the spring member to said set position.

HERBERT A. STILSON.